Patented Mar. 10, 1942

2,276,156

UNITED STATES PATENT OFFICE 2,276,156

PROCESS FOR MAKING 1-CYANO-1,3-BUTADIENE

Albert S. Carter and Frank Willard Johnson, Wilmington, Del., assignors to E. I. du Pont de Nemours & Company, Wilmington, Del., a corporation of Delaware No Drawing. Application August 2, 1940, Serial No. 350,074

10 Claims. (Cl. 260—464)

This invention relates to a process for preparing 1-cyano-1,3-butadiene from 4-chloro-1,2-butadiene or 4-bromo-1,2-butadiene and, more particularly, to the treatment of one of the latter compounds with solutions of inorganic cyanides in the presence of emulsifying agents.

The preparation of 1-cyano-1,3-butadiene by treating 4-chloro-1,2-butadiene with sodium cyanide in an aqueous-alcoholic medium has previously been disclosed by D. D. Coffman, (J. Amer. Chem. Soc. 57, 1981 (1935)) and by Carothers and Berchet (U. S. Patent No. 2,073,363, issued March 9, 1937). When carried out in this manner, side-reactions predominate and the yield of 1-cyano-1,3-butadiene is very low.

An object of this invention is to improve the yield of 1-cyano-1,3-butadiene obtainable from 4-chloro-1,2-butadiene or 4-bromo-1,2-butadiene. A further object is the elimination of organic solvents and simplification of the isolation of the product. Further objects will appear hereinafter.

These objects are accomplished by reacting the 4-chloro-1,2-butadiene (or 4-bromo-1,2-butadiene) with a water-soluble ionizable cyanide while the 4-chloro-1,2-butadiene is in aqueous emulsion. This may be done by agitating 4-chloro-1,2-butadiene with an aqueous solution of a water-soluble cyanide in the presence of emulsifying agents, preferably at an elevated temperature. The product may be isolated by steam distillation, preferably under reduced pressure, followed by separation of the non-aqueous phase, drying, and fractional distillation. An alternative method is to mechanically separate the non-aqueous phase after the reaction, followed by drying and fractional distillation. The separation may be hastened by centrifuging, freezing, or addition of soluble salts.

In order that the process may be more fully understood, the following specific examples are given. Such examples are merely by way of illustration. The invention is not limited thereto, but suitable variations may be made as will become more apparent hereinafter.

Example I

A solution of 320 parts by weight of sodium cyanide in 1064 parts of water, 4.7 parts of sodium salts of dinaphthyl methane sulfonic acids (prepared from naphthalene sulfuric acid and formaldehyde according to U. S. Patent No. 1,336,759), 0.4 part of catechol, and 472 parts of 4-chloro-1,2-butadiene are placed in a vessel which is then swept with nitrogen, the vessel closed, and the contents rapidly heated to 80° C., while being vigorously agitated. After 1½ to 2 hours, the mixture is rapidly cooled to atmospheric temperature and the agitation stopped. Under these conditions, the salt formed in the reaction will quickly break the emulsion and the lower, aqueous layer may be drawn off. Four-tenths (0.4) part of the antioxidant (catechol) is added to the non-aqueous layer which is then dried by passing through a bed of anhydrous calcium chloride and fractioned through an efficient column. A foreshot boiling up to 30° C. at 20 mm. pressure is first removed. This is mostly unreacted 4-chloro-1,2-butadiene which contains a trace of vinylacetylene and a small amount of 2-chloro-1,3-butadiene. After removal of the foreshot, an intermediate cut consisting of a mixture of 4-chloro-1,2-butadiene and 1-cyano-1,3-butadiene is obtained. The 1-cyano-1,3-butadiene is next distilled at 10 mm., boiling between 29° C. and 33° C. Two hundred and ten (210) parts of unchanged 4-chloro-1,2-butadiene are recovered and 150 parts of 1-cyano-1,3-butadiene are obtained by the fractional distillation. This amounts to approximately 65 per cent of the theoretical amount which would be obtained from the starting material consumed. The residue from the distillation contains a substantial amount of polymeric material and matter believed to be isonitrilic and hydrolysis products of the chlorobutadiene.

Example II

A mixture of 177 parts by weight of 4-chloro-1,2-butadiene, 0.5 part p-phenylenediamine, 120 parts sodium cyanide dissolved in 400 parts of water, 3 parts of sodium dodecyl sulfate and 0.5 part of casein is refluxed while agitated for 1.5 hours. One (1) part of active carbon is then added and the reactor connected to a downward condenser and receiver, cooled to 0° C. The pressure is gradually reduced to distill the product. When the condensate ceases to carry a non-aqueous phase, the distillation is discontinued and the product is separated from the water layer, dried, and fractionally distilled as described in the previous example, the yield and recovery of the starting material being of the same order as in Example I.

The 4-chloro-1,2-butadiene of the above examples may advantageously be made in the following manner. A reactor of a material resistant to hydrochloric acid and fitted with an efficient horizontal agitator is connected with a pump so that liquid may be pumped from the bottom of the reactor into a liquid separator. From the bottom of the separator, the aqueous solution returns continuously to the reactor by gravity feed while the non-aqueous phase that collects on the top during the operation may be drawn off into a storage tank. The aqueous reaction liquid is 3400 parts of 37 per cent hydrochloric acid. The solution is maintained at 25° C. to 30° C. and about 100 parts of monovinylacetylene are passed into the reactor per hour while the acid concentration is maintained approximately constant by passing in hydrogen chloride gas as rapidly as it reacts as shown by periodical titrations. Effluent gas from the reactor is recirculated with the fresh vinylacetylene. The liquid product from the separator is dried by passing through a bed of anhydrous calcium chloride, and is then fractionally distilled, which may be performed continuously or batch-wise. After removal of a small vinylacetylene foreshot (B. P. 760 5.5° C.), fractionation gives 2-chloro-1,3-butadiene at 33° C./300 mm. and the 4-chloro-1,2-butadiene distilling between 58° C. and 62° C. at 300 mm.

Any cyanide may be used in the process. Water-soluble, well-ionized cyanides are preferred. Examples of suitable cyanides are sodium cyanide, ammonium cyanide, potassium cyanide, barium cyanide, and calcium cyanide. The proportions used and the concentration of the cyanide solution are subject to considerable variation. If it is desired to utilize all of the cyanide, less than a molar proportion of cyanide may be used and the unreacted 4-chloro-1,2-butadiene recovered and used in a subsequent batch.

The temperature of the reaction is not critical and may be varied over wide limits. A lower reaction temperature results in a lower conversion rate which may be compensated for by increasing the reaction time. Increasing the temperature has the converse effect. Reaction at 60° C. to 100° C. is preferred.

It is preferable to carry out the reaction under non-oxidizing conditions. Thus, there may be used an inert atmosphere, such, for example, as nitrogen, neon, helium, argon, etc. Vapors of the reactants may create an inert atmosphere. Antioxidants, such, for example, as catechol or paraphenylene-diamine, may be added to minimize polymerization of the product during the reaction and isolation.

It is now well known that various classes of compounds have the qualities of promoting the formation and of maintaining aqueous emulsions of water-insoluble materials. Any emulsifying agent will work in the process of the invention. Particularly useful are the soluble salts of long-chain aliphatic acids (or similar soaps), the soluble salts of sulfonic acids containing a naphthalene nucleus, and the soluble salts of sulfate esters of long-chain alcohols. Substituted ammonium salts containing long hydrocarbon chains are useful. It has been found that, while any emulsifying agent will work, certain emulsifying agents are more satisfactory than others. The preferred emulsifying agents are the soluble salts of dinaphthyl methane sulfonic acids, the soluble salts of the sulfate esters of aliphatic alcohols containing more than 12 carbon atoms in the chain, and betaines containing long-chain aliphatic radicals of more than 12 carbon atoms. The first of these three preferred groups is especially preferred. The so-called protective colloids, such as certain protein and gums, may also be added.

The reaction may be carried out by emulsifying the 4-chloro-1,2-butadiene with a portion of the cyanide solution containing the emulsifying agent. Alternatively, it may be carried out by emulsifying the 4-chloro-1,2-butadiene with an aqueous solution of the emulsifying agent and the cyanide solution may be added gradually as the reaction proceeds.

It has been found that the reaction of the present invention produces a higher yield of the desired product when carried out with vigorous and continuous agitation and, hence, this procedure is preferred. This is especially true where the emulsion exhibits instability in the absence of agitation.

The yields of 1-cyano-1,3-butadiene obtained by this process represent a three- to four-fold increase over those obtained by the authors cited. This result is surprising and wholly unpredictable, especially since emulsification might be expected to increase the loss of product through polymerization during the reaction.

While the invention has been described in detail with reference to 4-chloro-1,2-butadiene as the raw material, 4-bromo-1,2-butadiene can be used in place thereof, and is within the scope of the invention.

It is apparent that many widely different embodiments of this invention may be made without departing from the spirit and scope thereof, and, therefore, it is not intended to be limited except as indicated in the appended claims.

We claim:

1. Process for the manufacture of 1-cyano-1,3-butadiene which comprises reacting a member of the group consisting of 4-chloro-1,2-butadiene and 4-bromo-1,2-butadiene with a water-soluble ionizable cyanide while the 4-chloro-1,2-butadiene is in aqueous emulsion.

2. Process for the manufacture of 1-cyano-1,3-butadiene which comprises reacting 4-chloro-1,2-butadiene with a water-soluble ionizable cyanide while the 4-chloro-1,2-butadiene is in aqueous emulsion.

3. Process for the manufacture of 1-cyano-1,3-butadiene which comprises reacting 4-chloro-1,2-butadiene with a water-soluble ionizable cyanide by agitating an emulsion of 4-chloro-1,2-butadiene in an aqueous solution of the cyanide.

4. Process for the manufacture of 1-cyano-1,3-butadiene which comprises reacting 4-chloro-1,2-butadiene with a water-soluble, well-ionized cyanide under non-oxidizing conditions while the 4-chloro-1,2-butadiene is emulsified in an aqueous solution of the cyanide and isolating the resultant.

5. Process for the manufacture of 1-cyano-1,3-butadiene which comprises reacting 4-chloro-1,2-butadiene with water-soluble, well-ionized cyanide by agitating the reactants in water in the presence of an emulsifying agent and isolating the resulting 1-cyano-1,3-butadiene by fractional distillation.

6. Process for the manufacture of 1-cyano-1,3-butadiene which comprises reacting 4-chloro-1,2-butadiene with sodium cyanide by agitating the reactants in water in the presence of an emulsifying agent and in an inert atmosphere at a temperature of between 60° C. and 100° C., breaking the emulsion, and isolating the resulting 1-cyano-1,3-butadiene by fractional distillation of the non-aqueous phase.

7. Process for the manufacture of 1-cyano-1,3-butadiene which comprises reacting 4-chloro-1,2-butadiene with a sodium cyanide by agitating the reactants in water in the presence of a soluble salt of a dinaphthyl methane sulfonic acid and a polymerization inhibitor in an inert atmosphere at a temperature of between 60° C. and 100° C., breaking the emulsion, and isolating the resulting 1-cyano-1,3-butadiene by fractional distillation of the non-aqueous phase.

8. Process for the manufacture of 1-cyano-1,3-butadiene which comprises reacting 4-chloro-1,2-butadiene with a water-soluble, well-ionized cyanide by dissolving the cyanide in water and emulsifying the 4-chloro-1,2-butadiene in the aqueous solution by the aid of a soluble salt of a dinaphthyl methane sulfonic acid, and isolating the resulting 1-cyano-1,3-butadiene.

9. Process for the manufacture of 1-cyano-1,3-butadiene which comprises reacting 4-chloro-1,2-butadiene with a water-soluble, well-ionized cyanide by dissolving the cyanide in water and emulsifying the 4-chloro-1,2-butadiene in the aqueous solution by the aid of a soluble salt of a sulfate ester of an aliphatic alcohol containing more than 12 carbon atoms in the chain, and isolating the resulting 1-cyano-1,3-butadiene.

10. Process for the manufacture of 1-cyano-1,3-butadiene which comprises reacting 4-chloro-1,2-butadiene with a water-soluble, well-ionized cyanide by dissolving the cyanide in water and emulsifying the 4-chloro-1,2-butadiene in the aqueous solution by the aid of a betaine containing a long-chain aliphatic radical of more than 12 carbon atoms, and isolating the resulting 1-cyano-1,3-butadiene.

ALBERT S. CARTER.
FRANK WILLARD JOHNSON.